July 14, 1959 C. G. DORN 2,895,060

FAST RISE PULSE GENERATOR WITH HIGH P. R. F.

Filed May 15, 1957 2 Sheets-Sheet 1

INVENTOR.
CLIFFORD G. DORN
BY
ATTORNEYS

FAST RISE PULSE GENERATOR WITH HIGH P. R. F

Filed May 15, 1957 2 Sheets-Sheet 2

*INVENTOR.*
CLIFFORD G. DORN
*BY* G. W. O'Brien
V. C. Muller
ATTORNEYS

United States Patent Office 2,895,060

Patented July 14, 1959

2,895,060

FAST RISE PULSE GENERATOR WITH HIGH P.R.F.

Clifford G. Dorn, Corona, Calif., assignor to the United States of America as represented by the Secretary of the Navy Application May 15, 1957, Serial No. 659,440

5 Claims. (Cl. 307—106)

(Granted under Title 35, U.S. Code (1952), sec. 266)

The invention described herein may be manufactured and used by or for the Government of the United States of America for governmental purposes without the payment of any royalties thereon or therefor.

This invention relates to a fast rise pulse generator with a high pulse repetition frequency and more particularly to a pulse generator which is capable of producing pulses with a fast rise time as low as 2 millimicroseconds or less at repetition rates as high as 10,000 cycles per second or more with high pulse power and adaptable to outputs of both positive and negative polarity in prearranged sequences.

With prior pulse generators, it has been impossible to provide pulses, having extremely fast rise times at a high repetition frequency and with large power output. Previously, rates of the order of 100 to 150 pulses per second were considered high for generation of pulses with a peak power output of the order of 50 watts and with a rise time of 2 millimicroseconds for a 50 volt pulse.

In one preferred embodiment of the pulse generator of the present invention, a modified commercially available mercury jet commutating switch, such as the "Deltaswitch," is utilized in conjunction with a pulse forming line to provide a pulse having an extremely short rise time and a high peak power output. The commercially available "Deltaswitch" is capable of providing pulses with a 30 millimicrosecond rise time at a pulse repetition rate of approximately 5,000 pulses per second with connections to the pins by means of a cable terminated in a multiple pin connector. In the present invention the cables are eliminated and a common copper bus bar is connected to all of the stator pins of the "Deltaswitch" internally in the immediate vicinity of the stator. The bus bar and rotor of the switch are also connected to a properly matched transmission line and a delay line as a pulse forming network.

The "Deltaswitch" may also be modified with alternate stator pins positive and negative and using two delay lines, or with various other combinations of two or more delay lines connected to alternate or successive pins in any desired order, and utilizing segments of bus bars to connect the desired pins to its corresponding pulse forming network.

One object of the present invention is to provide a pulse generator which is capable of producing pulses with a fast rise time and at repetition rates in excess of 10,000 cycles per second.

Another object of the invention is to provide a fast rise pulse generator with a high pulse repetition frequency which is capable of producing pulses having high pulse power.

A further object of the present invention is to provide a fast rise pulse generator having a high pulse repetition frequency and adaptable to produce outputs of both positive and negative polarity in any prearranged sequence.

Other objects and many of the attendant advantages of this invention will be readily appreciated as the same becomes better understood by reference to the following detailed description when considered in connection with the accompanying drawings wherein.

Figure 1:
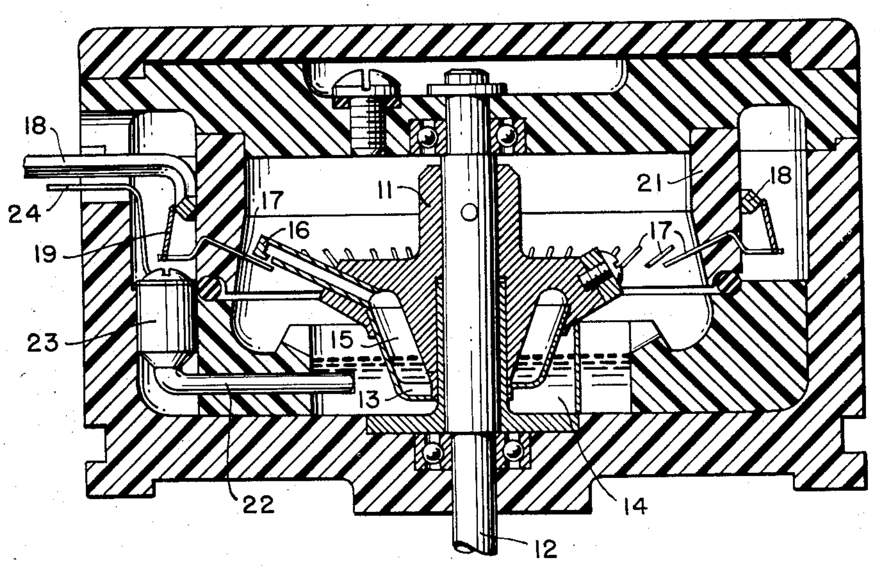
Fig. 1 is a sectional view illustrating one preferred embodiment of the modified mercury jet commutating switch of the present invention.

Referring now to the drawings in detail, a mercury switch is illustrated in Fig. 1 which consists of a modification of a commercially available mercury switch, such as the "Deltaswitch" illustrated in Patent No. 2,782,273 to William R. Davis et al. for Single-pole, Multi-contact Mercury Jet Switch.

The construction and operation of this switch are completely described in the above patent and consists essentially of a mercury jet commutating switch that utilizes a stream or jet of liquid mercury as a wiper arm. This technique allows high sampling or cyclic speed for long time intervals and keeps wear negligible. Because there is no spring constant nor resilience in the mercury stream, the switch has none of the contact bounce phenomena found in conventional commutators at high speeds. Basically, this mercury jet switch is designed around a simple centrifugal pump 11 driven through shaft 12 by a suitable motor (not shown) and primed by scoops such as 13 which lift mercury from a sump or pool 14 into a rotating reservoir 15. The mercury is ejected by centrifugal force from the reservoir 15 through a rotating nozzle 16 as a very fine solid stream or jet and is directed in sequence against stationary contacts 17 arranged around the rotating nozzle 16. The sequential contacting occurs in the course of the normal turning of the rotor 11 which serves both as a pump element and as a portion of the conducting path with the pole contact of the switch.

This switch is available with anywhere from 32 to 200 of the contact pins 17. However, in the present application, while a large number of pins 17 have been shown in Figs. 1 and 2 only 16 pins have been shown in the circuit diagrams of Figs. 3 and 4 as a matter of clarity in illustrating the invention.

Figure 2:
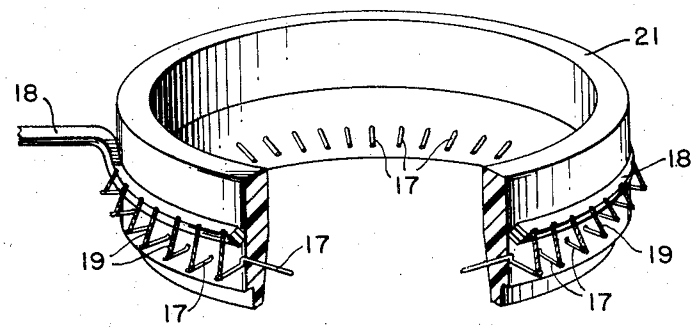
Fig. 2 is a perspective view with a portion of the stator broken away and illustrating the construction of the stator with the contact pins and their connections to the bus bar in one preferred embodiment of the present invention.

This switch as now manufactured, has connections to each of the pins by means of a cable terminated in a multiple pin connector. The modification of the present invention as illustrated in Figs. 1 and 2 eliminates the cables and utilizes a common copper bus bar 18, which is connected to all of the pins 17 internally using as short a wire 19 as possible. The bus bar 18 is mounted on the stator 21 as close to the pins 17 as permissible and is preferably terminated in a coaxial connector (not shown). The connection 22 to the sump 14 is also made as short as possible by connecting to the terminal post 23 by a wire 24 which is insulated and passes through the opening immediately adjacent the terminal post 23.

Figure 3:
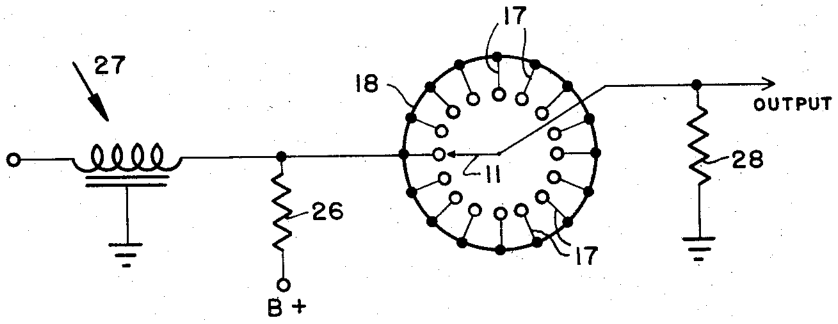
Fig. 3 is a schematic circuit diagram illustrating one preferred arrangement of the pulse generator of the present invention using a pulse forming line in conjunction with the mercury switch and stator arrangement as illustrated on Figs. 1 and 2.

As illustrated in Fig. 3 bus bar 18 is connected through a resistance 26 to the B+ voltage and also to the distributed constant delay line 27. The rotor 11 is connected through the sump 14 and insulated wire 24 to the output across a load resistance 28 as indicated in Fig. 3.

With the arm of the switch rotating at a rate of 60 revolutions per second and assuming that it sweeps across 81 contacts per revolution, this would give a pulse repetition rate of 4,860 pulses per second. This switch, however, may be driven to at least 150 revolutions per second and utilizing 200 contact pins would provide a pulse repetition frequency of 30,000 pulses per second.

The normal pulse duration of a switch with 81 contacts and rotating at a rate of 60 revolutions per second is approximately 100 microseconds with a period of approximately 200 microseconds. The maximum current is listed as 75 ma. However, using this switch with a delay line 27 as a pulse forming network allows pulse durations from .005 to 100 microseconds, depending upon the design of the pulse forming network. If the pulse forming network terminates the pulse before the mercury jet has left the pin, no arcing on break will occur, and thus this may not be a factor in determining the maximum current.

Figure 4:
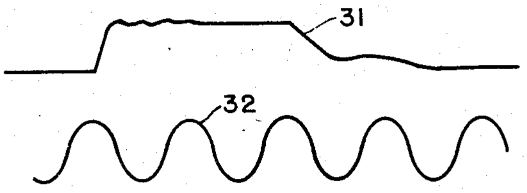
Fig. 4 is a pulse diagram illustrating a typical pulse output from the pulse generator of Fig. 3 compared to a 50 megacycle timing wave as traced from a photograph with one minute exposure time.

The modified switch as illustrated in Figs. 1 and 2 and connected as shown in Fig. 3 was tested and the pulse obtained is illustrated at 31 in Fig. 4 as compared to a 50 megacycle sign wave 32 for reference. This type of operation was used with a 50 ohm load resistance 28 and .035 microsecond pulse, charging the delay line 27 with 100 volts. This gave a 1 ampere pulse to the load. The switch was tested for eight hours at this rate and gave satisfactory operation.

The pulse 31 as illustrated in Fig. 4 has a rise time of 2 millimicroseconds and a 55 volt magnitude generated across the 50 ohm load resistor 28, this producing a peak power of 50 watts. Since the switch is not required to interrupt the high current being carried no arcing or deterioration of the contacts occurs.

Figure 5:
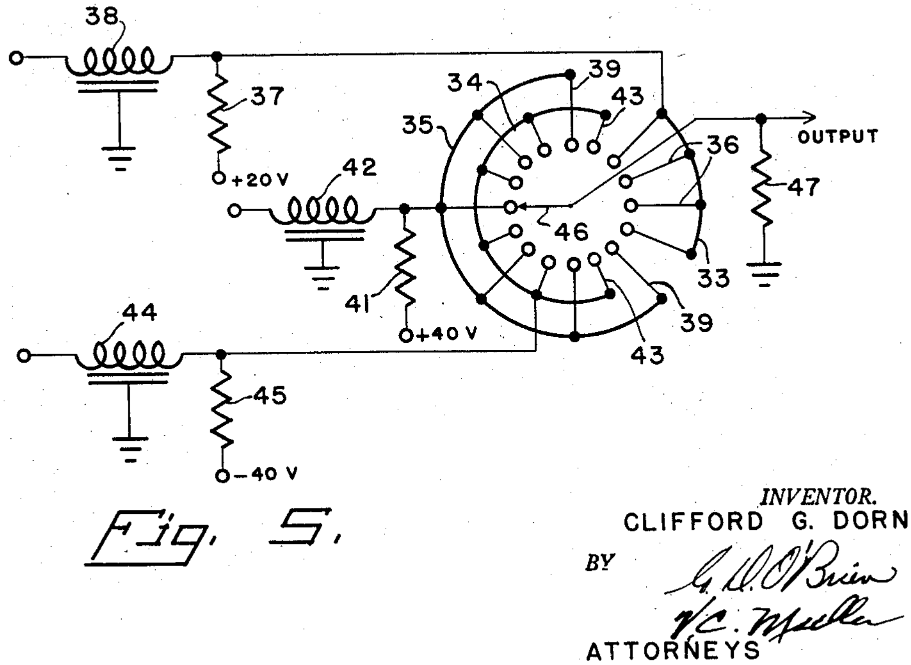
Fig. 5 is a schematic diagram illustrating one modification of the present invention using several pulse forming lines with several segmental bus bars for interconnecting the contact pins in the desired sequence.

The switch of the present invention may be modified with alternate segments, positive and negative, using two delay lines or any other combinations such as the one illustrated in Fig. 5 wherein three segments of bus bar 33, 34 and 35 are illustrated with the bus bar 33 connecting 4 consecutive pins 36 and being connected across the resistance 37 to the delay line 38 with the resistance 37 connected to a B+ voltage, such as plus 20 volts.

The second segmental bus bar 35 is connected to contact pins 39 and across the resistance 41 to a delay line 42 with the resistance 41 being connected to a plus 40 volts supply.

The third segmental bus bar 34 is connected to the contact pins 43 and to the delay line 44 across the resistance 45 which is connected to a minus 40 volts supply.

It will be apparent that the rotation of the rotary contact 46, as indicated in Fig. 4, will produce a series of pulses across the load resistance 47 to the output which will vary depending upon the specific connection of the contact pins. With the arrangement of the pins as indicated in Fig. 5 a series of four 10-volt pulses will be generated as the rotary arm 46 sweeps across the contacts 36, then a series of plus and minus 20-volt pulses will be generated as the rotary arm 46 sweeps across the contacts 39 and 43 successively.

It will be apparent that the pulse generator of the present invention has a multitude of applications, but is particularly useful in pulse testing diodes for transients, in testing switching times of ferrite and thin film memories, and in other instances where high pulse repetition rates allow oscilliscope observation of short time duration repetitive phenomena.

Obviously many modifications and variations of the present invention are possible in the light of the above teachings. It is therefore to be understood that within the scope of the appended claims the invention may be practiced otherwise than as specifically described.

What is claimed is:

1. A rotary jet switch comprising: a bowl provided at its bottom with a central mercury supply well; a ring of peripherally spaced contact pins mounted on and within said bowl substantially above the level of said well; a rotor mounted within said bowl coaxially therewith and provided with a nozzle having an orifice directed toward said ring of contact pins; a centrifugal pump provided on said rotor for pumping a stream of mercury from said well through said nozzle and on to said contact pins; means for establishing electrical communication between mercury contained within the bottom of said bowl and a point external thereto, and at least one segment of a bus bar mounted adjacent the outer ends of said pins and connected to certain of said pins.

2. A fast rise pulse generator comprising: a bowl provided at its bottom with a central mercury supply well; a ring of peripherally spaced contact pins mounted on and within said bowl substantially above the level of said well; a rotor mounted within said bowl coaxially therewith and provided with a nozzle having an orifice directed toward said ring of contact pins; a centrifugal pump provided on said rotor for pumping a stream of mercury from said well through said nozzle and on to said contact pins; means for establishing electrical communication between mercury contained within the bottom of said bowl and a point external thereto, a circular segment of a bus bar mounted adjacent the outer ends of said pins and connected to each of said pins and a pulse forming network operably connected to said circular segment whereby said means transmits pulses having a fast rise time at high repetition rates to said external point.

3. A fast rise pulse generator comprising: a bowl provided at its bottom with a central mercury supply well; a ring of peripherally spaced contact pins mounted on and within said bowl substantially above the level of said well; a rotor mounted within said bowl coaxially therewith and provided with a nozzle having an orifice directed toward said ring of contact pins; a centrifugal pump provided on said rotor for pumping a stream of mercury from said well through said nozzle and on to said contact pins; means for establishing electrical communication between mercury contained within the bottom of said bowl and a point external thereto, a plurality of segments of a bus bar mounted adjacent the outer end of said pins, each of said segments being connected to certain of said pins and a pulse forming network operably connected to each of said segments whereby said means transmits pulses having a fast rise time at high repetition rates to said external point.

4. A fast rise pulse generator comprising a pulse forming network whereby pulses having a fast rise and fall time are formed, a rotary mercury jet commutating switch having a rotor and a plurality of contact pins, at least one segment of a bus bar operably connecting said pulse forming network and certain of said pins whereby said switch and network generate pulses having a fast rise and fall time at high pulse repetition rates.

5. A pulse generator comprising in combination a pulse forming network including means for forming pulses with a fast rise and fall time and a rotary mercury jet commutating switch including a bowl provided at its bottom with a central mercury supply well, a ring of peripherally spaced contact pins mounted on and within said bowl substantially above the level of said well, a rotor mounted within said bowl coaxially therewith and provided with a nozzle having an orifice directed toward said ring of contact pins, a centrifugal pump provided on said rotor for pumping a stream of mercury from said well through said nozzle and onto said contact pins and a circular segment bus bar mounted adjacent the outer ends of said pins and operably connecting said pins and said pulse forming network whereby the output of said rotary switch comprises pulses having fast rise and fall times at a high repetitive rate.

References Cited in the file of this patent

UNITED STATES PATENTS

| | | |
|---|---|---|
| 2,408,824 | Varela | Oct. 8, 1946 |
| 2,418,128 | Labin et al. | Apr. 1, 1947 |
| 2,782,273 | Davis et al. | Feb. 19, 1957 |
| 2,796,475 | Finlay, Jr. | June 18, 1957 |